United States Patent [19]

Villax

[11] 3,761,498

[45] Sept. 25, 1973

[54] NEW PROCESS OF PREPARATION OF STEROIDS

[75] Inventor: Ivan Villax, Lisbon, Portugal

[73] Assignee: Plurichemie Anstalt, Vaduz, Liechtenstein

[22] Filed: May 26, 1972

[21] Appl. No.: 257,358

[30] Foreign Application Priority Data
June 5, 1971  Portugal.................................. 55886

[52] U.S. Cl..................... 260/397.45, 260/239.55 C
[51] Int. Cl........................................... C07c 169/34
[58] Field of Search ...... /Machine Searched Steroids

[56]  References Cited
UNITED STATES PATENTS
3,104,246   9/1963   Amiard et al.................. 260/397.45

OTHER PUBLICATIONS
Ercoli et al.–Gazz Chim Ital., Vol. 85, p. 1306, (1955).

Primary Examiner—Henry A. French
Attorney—Sidney G. Faber et al.

[57]  ABSTRACT

A new process for the preparation of $16\beta$-methyl-$17\alpha$-hydroxy-1,4,9(11)-pregnatriene-3,20-dione is characterized in that $16\alpha$, $17\alpha$-epoxy-$5\beta$-pregnane-3,11,20-trione is reacted with ethylene glycol to form $16\alpha$, $17\alpha$-epoxy-3,20-bis-ethylenedioxy-$5\beta$-pregnane-11-one, which is reacted with a borohydride to form $16\alpha,17\alpha$-epoxy-3,20-bis-ethylenedioxy-$11\beta$-hydroxy-$5\beta$-pregnane, which is reacted with methanesulfonyl chloride to form $16\alpha,17\alpha$-epoxy-3,20-bis-ethylenedioxy-$5\beta$-pregn-9(11)-ene, which in turn is reacted with a Grignard reagent to form $16\beta$-methyl-$17\alpha$-hydroxy-3,20-bis-ethylene-dioxy-$5\beta$-pregn-9(11)-ene and then with an aqueous acid solution to form $16\beta$-methyl-$17\alpha$-hydroxy-$5\beta$-pregn-9(11)-ene-3,20-dione which is brominated to form the levo rotatory 1,4-dibromo derivative and then debrominated to form the desired compound.

10 Claims, No Drawings

NEW PROCESS OF PREPARATION OF STEROIDS

Since 16β-methyl-9α-fluoroprednisolone, commonly known as betamethasone, and its derivatives are today the most active corticosteroids pharmacologically, they are also the most important in their group from a medical point of view.

Amongst the various patents referring to their preparation is U.S. Pat. No. 3,104,246 (1963) which utilizes the 16β-methyl-17α-hydroxy-1,4,9(11)-pregnatriene-3,20-dione of the formula:

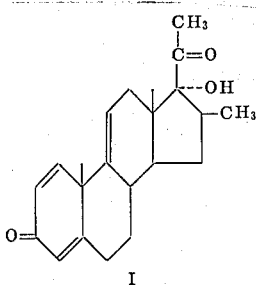

I as intermediary compound for the preparation of betamethasone. U.S. Pat. No. 3,104,246 also describes a process for the preparation of said intermediate.

The present invention relates to a process for the preparation of 16β-methyl-17α-hydroxy-1,4,9(11)-pregnatriene-3,20-dione through a new pathway which permits high yields, and wherein the number of steps necessary to obtain the intermediate is reduced. The process is thus very economical. In comparison to the process described in U.S. Pat. No. 3,104,246, the present process eliminates a few steps including reacetylation. Although this process utilizes chemical reactions known "per se," these reactions are applied herein to new compounds in a novel sequence which passes through intermediary compounds, most of them new and which are described for the first time in the present specification.

These compounds are valuable for preparing other steroids besides betamethasone, thus opening a wider route in the steroid synthesis. In short, the present invention describes a new and independent process for the preparation of steroids, particularly of betamethasone and its 21-acylates.

The present process uses, as starting compound, the 16α,17α-epoxy-5β-pregnane-3,11,20-trione of the formula:

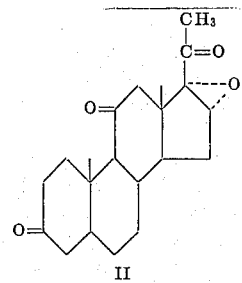

II which was first described by E. Ercoli and P. de Ruggieri, Gazz. Chim. Ital. 85, 1304-15 (1955). The diketalization at C3- and C20- yields the new compound 16-α,17α-epoxy-3,20-bis-ethylenedioxy-5β-pregnane-11-one of the formula:

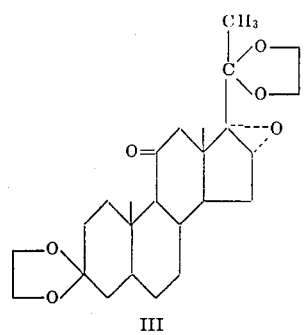

III

The reduction of compound III by sodium or potassium borohydride yields the new compound 16α,17α-epoxy-3,20-bis-ethylenedioxy-11β-hydroxy-5β-pregnane of the formula:

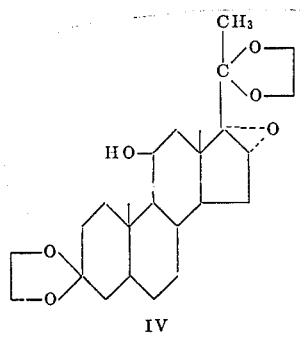

IV

Subsequently, the dehydration of compound IV by methanesulfonyl chloride, containing a catalytic amount of SO₃ (or, alternatively, thionyl chloride), yields the new compound 16α,17α-epoxy-3,20-bis-ethylenedioxy-5β-pregn-9(11)-ene of the formula:

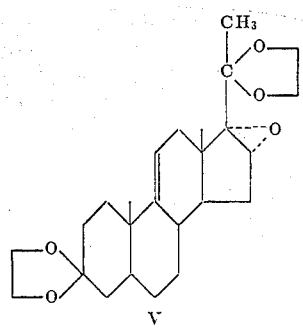

V

When reacting new compound V with a halo-methyl magnesium in great excess, the new compound 16β-methyl-17α-hydroxy-3,20-bis-ethylenedioxy-5β-pregn-9(11)-ene of the formula:

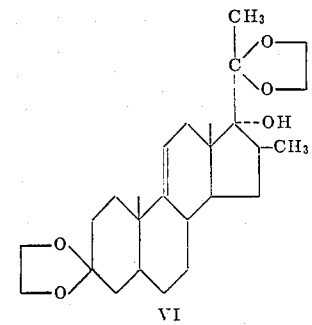

VI is obtained.

The deketalization of compound VI in an acid medium yields the 16β-methyl-17α-hydroxy-5β-pregn-9(11)-ene-3,20-dione of the formula:

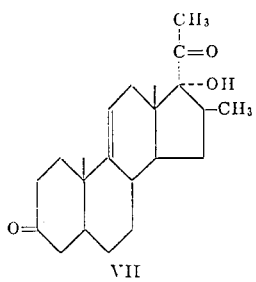

VII which compound is identical in its characteristics to that described in U.S. Pat. No. 3,104,246.

Compound I, which is the final product obtained according to the present process, may be prepared, either through dibromination at C1- and C4- followed by debromination by preparing preferably the dibrominated levogyre compound, that is, 16β-methyl-2α,4β-dibromo-17α-hydroxy-5β-pregn-9(11)-ene-3,20-dione of the formula:

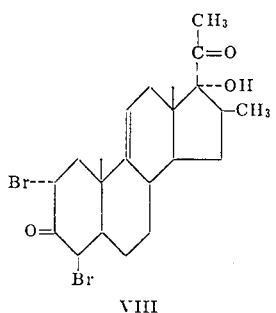

VIII and subsequently debrominating it, or by treating compound VII directly with 2,3-dihalo-5,6-dicyano-1,4-benzoquinone (DDQ). This alternative process yields compound I directly from compound VII, that is, in one step only.

The diketalization is carried out by using excess ethylene glycol, the catalyst being p-toluenesulfonic acid and the preferred medium anhydrous benzene, permitting the elimination of water by a Dean-Stark trap, preferably filled with sodium sulfate. The reaction is completed at the end of 15 to 28 hours of reflux. The reaction mixture is subsequently washed with a solution of sodium bicarbonate in order to separate the excess ethylene glycol and the p-toluene-sulfonic acid from the reaction mixture. The benzene phase is dried using anhydrous sodium sulfate and then evaporated in vacuum. Compound III is crystallized from the residue thus obtained by means of hot methanol containing 1 percent pyridine. The reduction of the ketone function at C11- is carried out by using sodium or potassium borohydride at the temperature of reflux, the medium being tetrahydrofuran, methanol and water. The reaction is completed at the end of 3 to 4 hours. Compound IV crystallizes after elimination of the organic solvents, under reduced pressure The 11β-hydroxy group, thus formed, is eliminated by means of methanesulfonyl chloride giving raise to a double bond in position 9(11). The solvent used preferably is 1 lower (1 to 10 carbon) dialkylformamide such as dimethylformamide, to which pyridine is added in excess with a view to maintaining the reaction mixture alkaline and thus avoiding the diketalization. With a view to assuring that the reaction is complete, it is necessary to perform same in the presence of a catalytic amount of sulfur trioxide or thionyl chloride.

The addition of methanesulfonyl chloride is made, preferably, at a temperature between $-15°$ and $-5°$ C., then stirring the reaction mixture for 3 to 4 hours and allowing it to warm up slowly. The crude product is recrystallized after precipitation with a mixture of water and ice containing 0.1 percent pyridine.

The simultaneous introduction of the methyl group in the sterical position β at C16- and of the hydroxyl in the sterical position α at C17- is carried out by using a halo-methyl magnesium, preferably methylmagnesium bromide, in an inert medium such as tetrahydrofuran and diethylether, the final concentration of the Grignard reagent being 3 to 3.3 × normal, and then refluxing the mixture at a temperature between $+85°$ and $+95°$ C., for 15 to 20 hours. After the reaction is completed, the mixture is diluted with tetrahydrofuran and then cooled. The excess of reagent is destroyed by the slow addition of water, yielding the new compound VI. Alternatively, the excess may be destroyed by addition of the reaction mixture to a mixture containing water, ice and hydrochloric acid, yielding directly compound VII. This compound can also be obtained from compound VI by treating its tetrahydrofuran solution with 10 percent hydrochloric acid at room temperature, or with 60–70 percent acetic acid at a temperature between $+85°$ and $+95°$ C., for ½ to 1 hour.

The introduction of the two double bonds at C2- and C4- is carried out according to the present invention through two independent pathways at free choice. The dibromination is performed in such a way as to yield the 2α,4β-levogyre dibromo derivative. The other pathway through DDQ follows the "per se" known process.

The examples appearing hereafter serve to illustrate the present invention, without however limiting its scope.

EXAMPLE 1

PHASE 1 — 67.5 g of 16α,17α-epoxy-pregnane-3,11,20-trione (E. Ercoli and P. de Ruggieri, Gazz. Chim. Ital. 85, 1304 (1955) melting point 194°–201° C.) is refluxed, under stirring, in 3,600 ml benzene containing 472.5 ml ethylene glycol and 3.15 g p-toluenesulfonic acid. After refluxing for 19 hours, the condensor being equipped with a Dean-Stark trap and containing anhydrous sodium sulfate in the collector, the reaction is completed which can be verified in an aliquot. After cooling the reaction mixture, it is washed with 675 ml 2N sodium carbonate diluted with 2,700 ml water. After separation of the benzene phase, it is dried with anhydrous sodium sulfate and the benzene solution is concentrated in vacuum until an oil is obtained. When methanol containing 1 percent pyridine is added, the new compound 16α,17α-epoxy-3,20-bis-ethylenedioxy-5β-pregnane-11-one (III) crystallizes. Melting point 153°–155° C., specific rotation $|\alpha|_D$ +90 (c = 1 in chloroform). Yield 56 g. When the mother-liquors are collected, a second fraction containing a satisfactorily pure product is obtained, which weighs 13.8 g.

| Analysis: $C_{25}H_{36}O_6$ | Molecular weight: 432.6 | | |
|---|---|---|---|
| Centesimal composition: | C | H | O |
| Calculated: | 69.42% | 8.39% | 22.19% |
| Found: | 69.8 % | 8.2 % | 22.3 % |

PHASE 2 — 89 g potassium borohydride in 450 ml water, 180 g 16α,17α-epoxy-3,20-bis-ethylenedioxy-5β-pregnane-11-one in 2,250 ml tetrahydrofuran and 900 ml methanol are added together in a nitrogen atmosphere, under stirring. After refluxing for 3 hours, 3,600 ml water is added and the organic solvents are eliminated by distillation, under reduced pressure, after which the 16α,17α-epoxy-3,20-bis-ethylenedioxy-11β-hydroxy-5β-pregnane (IV) crystallizes. Yield 158.8 g. The infrared absorption spectrum shows no maximum in the region of $5.5\mu$ to $6.5\mu$.

| Analysis: $C_{25}H_{38}O_6$ | Molecular weight: 434.6 | | |
|---|---|---|---|
| Centesimal composition: | C | H | O |
| Calculated: | 69.1% | 8.81% | 22.09% |
| Found: | 68.9% | 8.7 % | 22.2 % |

PHASE 3 — 70 ml methanesulfonyl chloride containing traces of $SO_3$ is added dropwise to 150 g of the product obtained in phase 2 in 750 ml dimethylformamide and 200 ml pyridine, at a temperature of $-10°$ C. After the addition is completed, the reaction mixture is stirred for 5 hours, and then allowed to warm up slowly. Afterwards, the reaction mixture is poured into 6,500 ml water and ice containing 0.65 ml pyridine, forming a sticky mass which crystallizes slowly when stirred. Yield 147 g. After recrystallization from methanol containing 1 percent pyridine, 136.6 g of pure product is obtained. The infrared absorption spectrum shows no maximum in the region of $2.5\mu$ to $3.2\mu$.

| Analysis: $C_{25}H_{36}O_5$ | Molecular weight: 416.6 | | |
|---|---|---|---|
| Centesimal composition: | C | H | O |
| Calculated: | 72.8% | 8.71% | 19.2% |
| Found: | 71.7% | 8.6 % | 19.3% |

PHASE 4 — (A) 100 g of the product obtained in Phase 3 is added to 550 ml methylmagnesium bromide 2 to 2.2 N in tetrahydrofuran, under a nitrogen atmosphere. The reaction mixture is then concentrated with a view to obtaining a concentration of the Grignard reagent between 3 to 3.3 normal, and then maintained in reflux for 18 hours.

Subsequent to reflux, the reaction mixture is cooled to 40° C., 1,200 ml tetrahydrofuran is added, and when the temperature is in the range between 20° and 25° C., water is added in such a way as to maintain the mixture at that temperature. After destruction of the Grignard reagent present in excess, 2,000 ml water is added, and at least half the amount of tetrahydrofuran is eliminated, under reduced pressure. The 16β-methyl-17α-hydroxy-3,20-bis-ethylenedioxy-5β-pregn-9(11)-ene crystallizes. Yield 99.4 g.

| Analysis: $C_{26}H_{40}O_5$ | Molecular weight: 432.6 | | |
|---|---|---|---|
| Centesimal composition: | C | H | O |
| Calculated: | 72.19% | 9.32% | 18.49% |
| Found: | 72.01% | 9.18% | 18.61% |

The product thus obtained is then dissolved in 100 ml 70 percent acetic acid and warmed to 90° C., for half an hour. Afterwards, it is precipitated by the addition of 500 ml water, after which the 16β-methyl-17α-hydroxy-5β-pregn-9(11)-ene-3,20-dione crystallizes. After washing with isopropyl ether, a yield of 77.1 g is obtained.

(B) Alternatively, the reaction mixture is cooled and diluted subsequent to reflux, and poured into a mixture of water and ice containing 12 percent concentrated hydrochloric acid, followed by the addition of 1,000 ml ethylether. After stirring and recycle of the phases thus formed for 2 hours, the organic solvents are eliminated under reduced pressure. The formed crystals are filtered, washed with water and then with isopropyl ether. The 16β-methyl-17α-hydroxy-5β-pregn-9(11)-ene-3,20-dione, thus obtained, presents identical physical and chemical characteristics to those of the product described in U.S. Pat. No. 3,104,246. Yield 81.2 g.

PHASE 5 — 51.6 ml elemental bromine in 2,630 ml acetic acid is added, under stirring, to 172 g of the product obtained in Phase 4 (B) in 200 ml dioxane and 2,000 ml acetic acid containing 1 g anhydrous hydrogen bromide at $+5°$ C., for a period of 25 minutes. It is stirred for 3 hours and then poured into a mixture of 20 liters water and ice, thus precipitating the 16β-methyl-2α,4β-dibromo-17α-hydroxy-5β-pregn-9(11)-ene-3,20-dione. The product thus obtained is crystallized from isopropyl ether, yielding 21.2 g of the levogyre 2,4-dibrominated product.

| Analysis: $C_{22}H_{30}O_3Br$ | Molecular weight: 502.3 | |
|---|---|---|
| Centesimal composition: | C | Br |
| Calculated: | 52.6% | 31.82% |
| Found: | 52.4% | 32.1 % |

PHASE 6 — 50 g of the debrominated product, obtained according to Phase 5, is then debrominated in 500 ml dimethylformamide containing 100 g anhydrous lithium carbonate and 50 g anhydrous lithium bromide, by warming to 125°-130° C. for 150 minutes. It is cooled and poured slowly into 3 liters water and ice containing 200 ml acetic acid. It is filtered, washed and dried. After recrystallization from ethyl acetate and isopropyl ether, 32 g of 16β-methyl-1,4,9(11)-pregnatriene-3,20-dione is obtained. The product has the same physical and chemical characteristics as those described for this compound in U.S. Pat. No. 3,104,246.

EXAMPLE 2

100 g of compound VII, obtained in the previous Example in Phase 4 (B), is refluxed in 2 liters dioxane containing 200 g 2,3-dichloro-5,6-dicyano-1,4-benzoquinone for 24 hours. The solution is cooled and the crystals, thus formed, are collected. After treating with active charcoal, the filtrate is concentrated in vacuum. The recrystallization of the residue, thus obtained, from ethyl acetate and isopropyl ether yields directly 61 g of 16β-methyl-1,4,9(11)-pregnatriene-3,20-dione. $E_{1 cm.}^{1\%}$ 436 at 240 m$\mu$ (in ethanol). From this intermediate betamethasone and its 21-acylates are then prepared in accordance with the examples of U.S. application Ser. No. 98,202 (1970), or according to the examples in U.S. Pat. No. 3,104,246.

I claim:

1. A new process of preparation of 16β-methyl-17α-hydroxyl-1,4,9(11)-pregnatriene-3,20-dione comprising:
   a. reacting 16α,17α-epoxy-5β-pregnane-3,11,20-trione with an excess of ethylene glycol in the presence of a solvent thus forming an azeotropic mixture with water and in presence of p-toluenesulfonic acid, yielding the new compound 16α,17α-epoxy-3,20-bis-ethylenedioxy-5β-pregnane-11-one;
   b. reacting 16α,17α-epoxy-3,20-bis-ethylenedioxy-5β-pregnane-11-one with sodium or potassium borohydride in an aqueous-organic medium, yielding the new compound 16α,17α-epoxy-3,20-bis-ethylenedioxy-11β-hydroxy-5β-pregnane;
   c. reacting 16α,17α-epoxy-3,20-bis-ethylenedioxy- 11β-hydroxy-5β-pregnane with methanesulfonyl chloride in the presence of a catalytic amount of SO₃ or thionyl chloride in an inert medium free of water in the presence of a tertiary amine, yielding the new 16α,17α-epoxy-3,20-bis-ethylenedioxy-5β-pregn-9(11)-ene;

d. reacting 16α,17α-epoxy-3,20-bis-ethylenedioxy-5β-pregn-9(11)-ene with an excess of halo-methyl magnesium in the presence of an inert medium, yielding the new 16β-methyl-17α-hydroxy-3,20-bis-ethylenedioxy-5β-pregn-9(11)-ene;

e. reacting 16β-methyl-17α-hydroxy-3,20-bis-ethylenedioxy-5β-pregn-9(11)-ene with an aqueous acid solution, yielding 16β-methyl-17α-hydroxy-5β-pregn-9(11)-ene-3,20-dione;

f. reacting 16β-methyl-17α-hydroxy-5β-pregn-9(11)-ene-3,20-dione with elemental bromine in a solvent or mixture of inert solvents in the presence of a catalytic amount of anhydrous hydrogen bromide in acetic acid, yielding the levo rotatory 16β-methyl-2α,4β-dibromo-17α-hydroxy-5β-pregn-9(11)-ene-3,20-dione; and g. reacting 16β-methyl-2α,4β-dibromo-17α-hydroxy-5β-pregn-9(11)-ene-3,20-dione with a debrominating agent in an organic medium, yielding the desired 16β-methyl-17α-hydroxy 1,4,9(11)-pregnatriene-3,20-dione.

2. New process according to claim 1 wherein the reaction medium is:
   in step (a), benzene;
   in step (b), a mixture of tetrahydrofuran, methanol and water;
   in step (c), lower dialkylformamide;
   in step (d), tetrahydrofuran or lower dialkylether;
   in step (e), methanol, tetrahydrofuran or aqueous acetic acid;
   in step (f), dioxane or ethyl acetate; and
   in step (g), lower dialkylformamide.

3. New process according to claim 1 wherein the reaction temperature is:
   in step (a), the temperature of reflux;
   in step (b), the temperature of reflux;
   in step (c), between −15° and +45° C.;
   in step (d), the temperature of reflux, the concentration of the Grignard reagent being between 3 to 3.3 N;
   in step (e), between +15° and +25° C. when 10 percent hydrochloric acid is present and between +85° and +95° C. when acetic acid is present;
   in step (f), below +8° C.; and
   in step (g), between +130° and +138° C.

4. New process according to claim 1 wherein the time of reaction is:
   in step (a), from 15 to 28 hours;
   in step (b), from 3 to 4 hours;
   in step (c), from 4 to 5 hours;
   in step (d), from 15 to 20 hours;
   in step (e), from ½ to 1 hour;
   in step (f), from 1 to 3 hours; and
   in step (g), from 2 to 3 hours.

5. New process according to claim 1 wherein the tertiary amine in (c) is pyridine.

6. New process according to claim 1 wherein the halo-alkyl magnesium in (d) is methylmagnesium bromide.

7. New process according to claim 1 wherein the aqueous acid in (e) is 10 to 15 percent hydrochloric acid and the solvent is methanol and tetrahydrofuran or 75 percent aqueous acetic acid without any additional solvent.

8. New process according to claim 1 wherein the debromination is carried out with lithium bromide and lithium carbonate.

9. New process according to claim 1 for obtaining 16-β-methyl-17α-hydroxy-1,4,9(11)-pregnatriene-3,20-dione directly from 16β-methyl-17α-hydroxy-5β-pregn-9(11)-ene-3,20-dione, wherein 16β-methyl-17α-hydroxy-5β-pregn-9(11)-ene-3,20-dione is reacted with an excess of 2,3-dichloro-5,6-dicyano-1,4-benzoquinone, or with the equivalent 2,3-dibromo-derivative in dioxane and refluxed for 16 to 28 hours.

10. 16β-methyl-2α,4β-dibromo-17α-hydroxy-5β-pregn-9(11)-ene-3,20-dione.

* * * * *